(12) United States Patent
Guru et al.

(10) Patent No.: US 11,211,851 B2
(45) Date of Patent: Dec. 28, 2021

(54) SYSTEM AND METHOD FOR PROVIDING SAFE LIMITED FORCE PRODUCING POWER IN A MOTOR

(71) Applicant: Rockwell Automation Technologies, Inc., Mayfield Heights, OH (US)

(72) Inventors: Arun K. Guru, Brookfield, WI (US); Xiaobo Peng, Shanghai (CN); Robert H. Schmidt, Germantown, WI (US); Aleksey Yegorov, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 272 days.

(21) Appl. No.: 16/409,027

(22) Filed: May 10, 2019

(65) Prior Publication Data
US 2020/0358340 A1 Nov. 12, 2020

(51) Int. Cl.
*H02K 11/27* (2016.01)
*H02P 6/12* (2006.01)
(Continued)

(52) U.S. Cl.
CPC .............. *H02K 11/27* (2016.01); *H02P 3/00* (2013.01); *H02P 6/12* (2013.01); *H02P 6/22* (2013.01)

(58) Field of Classification Search
CPC .. H02P 6/16; H02P 31/00; H02P 29/02; H02P 27/06; H02P 25/02; H02P 23/14;
(Continued)

(56) References Cited

U.S. PATENT DOCUMENTS

| 7,737,652 B2 * | 6/2010 | Schwesig ............... H02P 29/02 318/432 |
| 8,135,977 B2 | 3/2012 | Francescon et al. |

(Continued)

FOREIGN PATENT DOCUMENTS

| CN | 103863122 A | 6/2014 |
| DE | 10100565 A1 | 7/2002 |

(Continued)

OTHER PUBLICATIONS

Extended European Search Report dated Sep. 23, 2020; Application No./Patent No. 20171229.6-1202—(7) pages.

*Primary Examiner* — Said Bouziane
(74) *Attorney, Agent, or Firm* — Boyle Fredrickson, SC (57) ABSTRACT

A motor drive utilizes redundant current feedback to monitor force being produced by a motor and to provide safe limited force producing operation of the motor. A first set of current sensors provides a first current measurement, and a second set of current sensors provides a second current measurement. The two current measurements are provided to two diverse force producing calculations, where each force producing calculation provides a value of the force produced by the motor. The motor drive compares the output of the two algorithms to each other. If the output of the two force producing calculations is the same, within an acceptable band, the controller continues operating as commanded. If the output of the two force producing calculations differs beyond the acceptable band, then the controller may generate a fault message provided back to a central controller, stop operation of the motor, or a combination thereof.

19 Claims, 8 Drawing Sheets

(51) Int. Cl.
*H02P 6/22* (2006.01)
*H02P 3/00* (2006.01)

(58) Field of Classification Search
CPC ......... H02P 21/00; H04L 5/1484; G05B 9/03; G05B 9/02; G01D 5/12; G06F 15/16; G06F 1/12; G01R 31/34
See application file for complete search history.

(56) References Cited

U.S. PATENT DOCUMENTS

| | | |
|---|---|---|
| 8,344,682 B2 | 1/2013 | Gaiser et al. |
| 9,146,166 B2 | 9/2015 | Kopken et al. |
| 9,325,165 B2* | 4/2016 | Behringer ............... H02H 5/047 |
| 9,431,945 B2* | 8/2016 | Thomas ................. H02P 27/08 |
| 10,027,263 B2* | 7/2018 | Toens ................. H02P 29/0241 |
| 10,060,983 B2* | 8/2018 | Mayrhofer ............. G01R 31/34 |
| 2003/0015987 A1* | 1/2003 | Cheong ................. H02P 21/24 318/701 |
| 2014/0152205 A1* | 6/2014 | Nakai ..................... H02P 21/05 318/400.02 |
| 2018/0091072 A1 | 3/2018 | Sun et al. |
| 2018/0269822 A1* | 9/2018 | Aizawa ................ H02P 29/662 |
| 2019/0131904 A1* | 5/2019 | Aoki ....................... H02M 1/08 |
| 2020/0353973 A1* | 11/2020 | Nakamura ............. H02P 27/08 |

FOREIGN PATENT DOCUMENTS

| | | |
|---|---|---|
| EP | 2555368 A1 | 2/2013 |
| JP | H08 116691 A | 5/1996 |

* cited by examiner

SYSTEM AND METHOD FOR PROVIDING SAFE LIMITED FORCE PRODUCING POWER IN A MOTOR

BACKGROUND INFORMATION

The subject matter disclosed herein relates generally to a system and method for providing safe limited force producing operation in a motor and, more specifically, to a system and method for obtaining multiple current measurements and executing multiple force producing calculations in order to achieve a desired safety rating when providing a force limiting function in a motor and motor drive combination.

Electrical rotating machines, such as electric motors or generators, have become widespread and are found in numerous applications and configurations. Electric machines include a stationary component (i.e., the stator) and a rotating component (i.e., the rotor). In electric motors, a magnetic field is established in the rotor, for example via magnets mounted to the rotor or via an electrical current applied to or induced in a coil wound on the rotor. A second, rotating magnetic field is established as a result of a stator current produced by a controlled voltage applied to the stator. Rotation of the magnetic field in the stator causes the magnetic field in the rotor to follow the stator field, thereby causing rotation of the rotor. A shaft or other drive member is mounted to the rotor and extends outside the rotor housing providing a mechanical coupling to a device, such as a gearbox, pump, or fan that is to be driven as the rotor rotates. The amplitude and frequency of the controlled voltage applied to the stator is varied to achieve desired operation of the motor.

As is known to those skilled in the art, motor controllers, also referred to herein as motor drives, are utilized to vary the amplitude and frequency of the voltage applied to a motor to achieve desired operation of the motor. A motor controller is configured to receive power at an input, where the input power may be supplied from either an alternating current (AC) source or a direct current (DC) source. If the input power is supplied from an AC source, a rectifier section converts the AC power to DC power. The DC bus, either from the output of the rectifier section or supplied directly from the DC source is provided to a DC bus within the motor controller. A current regulator and modulation techniques are used to control an inverter section which, in turn, supplies the required current and voltage to the motor from the DC bus to achieve desired operation of the motor.

In certain applications, it may be desirable to operate the motor at a reduced torque level. For example, during commissioning, it may be desirable to limit the amount of torque output by the motor until it has been verified that the motor is being properly controlled by the motor drive. Alternately, the desired operation of an application may require the motor to operate at a limited torque. A spooling application, for example, may demand limited torque output from the motor to facilitate manual spooling of a material for a web. Historically, it has been known to provide an input to the motor drive to indicate that operation at the reduced torque level is required. The motor drive can adjust the maximum torque limit for the motor drive in response to receiving the input and, thereby, limit the torque produced by the motor.

In still other applications, there may be a requirement of human interaction with the controlled machine or process, and it may be desirable to limit the amount of torque a motor may produce during this interaction to reduce or prevent the risk of injury during this interaction. When human interaction is required, the application typically requires a safety monitoring system with a high degree of certainty that the safety function will perform as intended. Simply providing an input to the motor drive and relying on the motor drive to respond to this input to limit torque, as previously described for limiting torque in a motor, does not typically satisfy the requirements of a safety monitoring system that is required during human interaction. Failure, for example, of a single component may allow the motor drive to continue operating at full torque rather than operating at the required limited torque and fails- to provide the desired degree of certainty that the limited torque function will perform as intended. The safety monitoring system may, therefore, require redundancy in the system to increase reliability. For example, the user interface may require two pushbuttons or two switches to be set to initiate a desired action. Similarly, the interface device may output two signals from two contactors which are wired in parallel back to a controller to provide two input signals which are monitored. Alternately, monitoring systems may be implemented in which additional feedback signals are provided to verify desired operation. For example, the push button may include a micro switch to detect that the button was pressed, where the micro switch sends an independent signal to the controller in parallel with the signal from the pushbutton.

Despite the addition of redundant components or monitoring systems providing additional feedback, there is still a single point of failure present in applications requiring limited torque operation. A single motor drive is necessarily required to control operation of the motor. Thus, while some improvements in reliability may be obtained by redundant controls, the motor drive remains a single point of failure and has previously limited the safety rating of a system that may be obtained.

Thus, it would be desirable to provide a motor drive with improved reliability, which, in turn, increases the degree of certainty that a safety monitoring system operates as intended during safe limited torque operation of a motor.

BRIEF DESCRIPTION

The subject matter disclosed herein describes a motor drive with improved reliability, which, in turn, increases the degree of certainty that a safety monitoring system operates as intended during safe limited force producing operation of a motor. In a rotary motor, the safe limited force is a safe limited torque. In a linear motor, the safe limited force is a linear force along the direction of travel of the linear motor. For ease of discussion, the invention will be described with respect to a rotary motor and a safe limited torque. It is understood that the safe limited force determination may similarly be applied on a linear motor application without deviating from the scope of the invention. The motor drive utilizes redundant current feedback to monitor the torque being produced by a motor operatively controlled by the motor drive. A first set of current sensors is provided within the motor drive and measures the current being output to the motor. The first set of current sensors may be current sensors typically included within a motor drive and used to regulate the current output to the motor. In many applications, however, a motor drive utilizes two current sensors to monitor a three-phase current output to the motor. Each sensor measures the current in one of two phases and the current in the third phase is determined by assuming a balanced current exists in the three phases. In the present invention, it is contemplated that three current sensors are provided within the motor drive, where each sensor measurers the current provided to one phase of the motor. A second set of current sensors is provided in the system for redundant current feedback. The second set of sensors may be provided external to the motor drive. It is contemplated that the second set of current sensors is mounted in the motor. Optionally, the second set of sensors may be mounted in a junction box to which a motor cable is connected or within a connector of the motor cable supplying current from the motor drive to the motor. The current feedback from both sets of current sensors is provided to a controller within the motor drive to determine a level of torque being produced by the motor.

The controller may be a single processor or redundant processors executing in parallel according to known techniques. The controller uses the feedback signals from the first current sensors to determine the torque produced by the motor according to a first torque calculation and uses the feedback signals from the second current sensors to determine the torque produced by the motor according to a second torque calculation. According to one aspect of the invention, the first and second torque calculations utilize different algorithms for determining the torque produced by the motor. The diversity of the algorithms increases the safety level of the controlled system. If the same algorithm is executed in a redundant manner, an error in a value used by the algorithm would generate the same erroneous output by both calculations. However, if there is an error in a value used by one of the algorithms, or even by both algorithms, while the output of each algorithm may be erroneous, it is less likely that the two algorithms will generate the same erroneous result.

The controller then compares the output of the two algorithms to each other. If the controller is executing correctly, the output of the two algorithms should provide the same torque calculation within an acceptable band. If the output of the two torque calculations is the same, the controller continues operating as commanded. If the output of the two torque calculations differs beyond the acceptable band, then the controller may generate a fault message, safely stop operation of the motor, or a combination thereof.

According to a first embodiment of the invention, a method for providing a safe limited force producing power in a motor is disclosed. A first value of a current present in each phase of a stator of the motor is measured with a first set of current sensors. A second value of the current present in each phase of the stator of the motor is determined, where determining the second value of the current present in each phase of the stator is synchronized in time with measuring the first value of the current present in each phase of the stator. A first value of a force produced by the motor is determined as a first function of the value of the current present in each phase of the stator, and a second value of the force produced by the motor is determined as a second function of the value of the current present in each phase of the stator. The first function is different than the second function, the first function uses the first value of the current, and the second function uses the second value of the current. An input signal, corresponding to a safe state of operation of the motor, is received at a motor drive, where the motor drive is operatively connected to control operation of the motor. Responsive to receiving the input signal, the motor drive is operative to limit the current output to the motor, compare the first value of the force to the second value of the force, and stop operation of the motor when the first value of the force differs from the second value of the force by more than a predefined value.

According to another embodiment of the invention, a system for providing a safe limited force producing power is disclosed. The system includes a motor and a motor controller operatively connected to control operation of the motor. The motor has a stator, a rotor, and a housing in which the stator and rotor are mounted. The motor controller has a first set of current sensors and at least one processor. The first set of current sensors are operative to measure a first value of a current present in each phase of the stator. The at least one processor is operative to sample a first value of the current present in each phase of the stator from the first set of current sensors and to receive a second value of the current present in each phase of the stator from a second set of current sensors. The second set of current sensors are external to the motor controller, and a sampling circuit operatively connected to the second set of current sensors samples the second value of the current synchronously with the processor sampling the first value of the current. A first value of a force produced by the motor is determined as a first function of the value of the current present in each phase of the stator, and a second value of the force produced by the motor is determined as a second function of the value of the current present in each phase of the stator, where the second function is different than the first function. The first value of the force is compared to the second value of the force in the motor drive, and when the first value of the force differs from the second value of the force by more than a predefined value, operation of the motor is stopped.

According to still another embodiment of the invention, a method for providing a safe limited force producing power in a motor is disclosed. The motor drive receives a first value of a current present in each phase of a stator of the motor and is operatively connected to control operation of the motor. The first value of the current is measured with a first set of current sensors. The motor drive determines a second value of the current present in each phase of the stator of the motor, where determining the second value of the current present in each phase of the stator is synchronized in time with measuring the first value of the current present in each phase of the stator. A first value of a force produced by the motor is determined as a first function of the value of the current present in each phase of the stator, and a second value of the force produced by the motor is determined as a second function of the value of the current present in each phase of the stator. The first function is different than the second function, the first function uses the first value of the current, and the second function uses the second value of the current. The first value of the force is compared to the second value of the force in the motor drive, and operation of the motor is stopped with the motor drive when the first value of the force differs from the second value of the force by more than a predefined value.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 1:
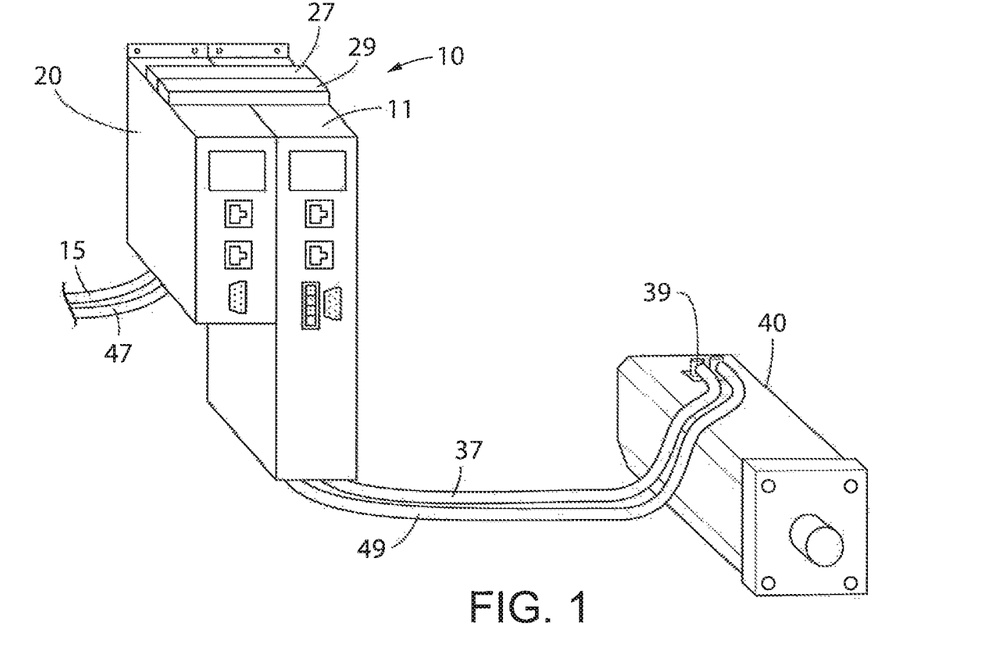
FIG. 1 is an exemplary embodiment of a motor and a panel-mounted motor drive incorporating the present invention.
Figure 6:
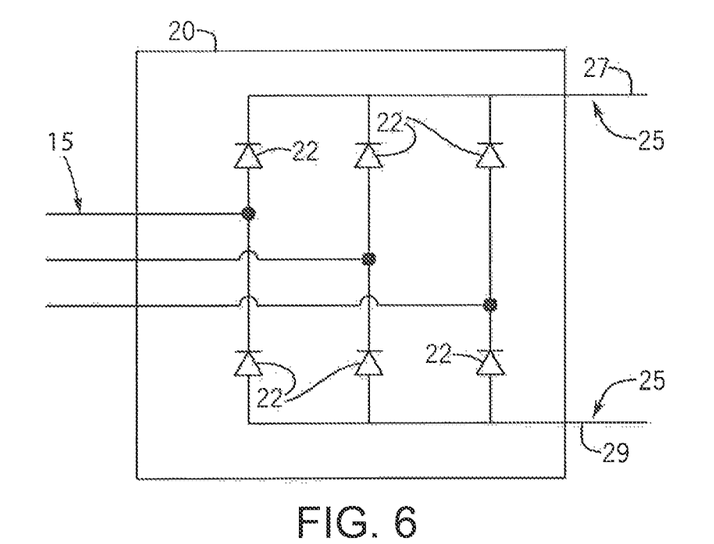
FIG. 6 is a schematic representation of a passive rectifier used in FIGS. 3-5.

Turning initially to FIG. 1, a motor controller 10, which may be used in conjunction with the various embodiments of the invention disclosed herein, is illustrated. According to the exemplary embodiment, the motor controller 10 includes a front-end rectifier 20 and a motor drive 11. The front-end rectifier 20 is configured to receive a three-phase AC voltage 15 at an input to the rectifier 20. The rectifier 20 may include any electronic device suitable for passive or active rectification as is understood in the art. With reference also to FIG. 6, the illustrated front-end rectifier 20 includes a set of diodes 22 forming a diode bridge that rectifies the three-phase AC voltage to a DC voltage on the DC bus 25. Optionally, the rectifier section 20 may include other solid-state devices including, but not limited to, thyristors, silicon-controlled rectifiers (SCRs), insulated-gate bipolar transistors (IGBTs), power metal-oxide semiconductor field-effect transistors (MOSFETs), Silicon Carbide field-effect transistors (SiC FETs), Gallium Nitride field-effect transistors (GaN FETs), or other transistors or solid-state devices to convert the input power 15 to a DC voltage for the DC bus 25. Optionally, the front-end rectifier may also include one or more capacitors connected in parallel, in series, or in a combination thereof across the DC bus 25, providing at least a portion of the DC bus capacitance in the system. The DC voltage is present between a positive rail 27 and a negative rail 29 of the DC bus 25. The magnitude of the DC voltage between the negative and positive rails, 29 and 27, is generally equal to the magnitude of the peak of the AC input voltage. One or more motor drives 11 may be connected to the DC bus 25 to receive the DC voltage present on the bus and to use the DC voltage to control one or motors connected to each motor drive 11.

Figure 3:
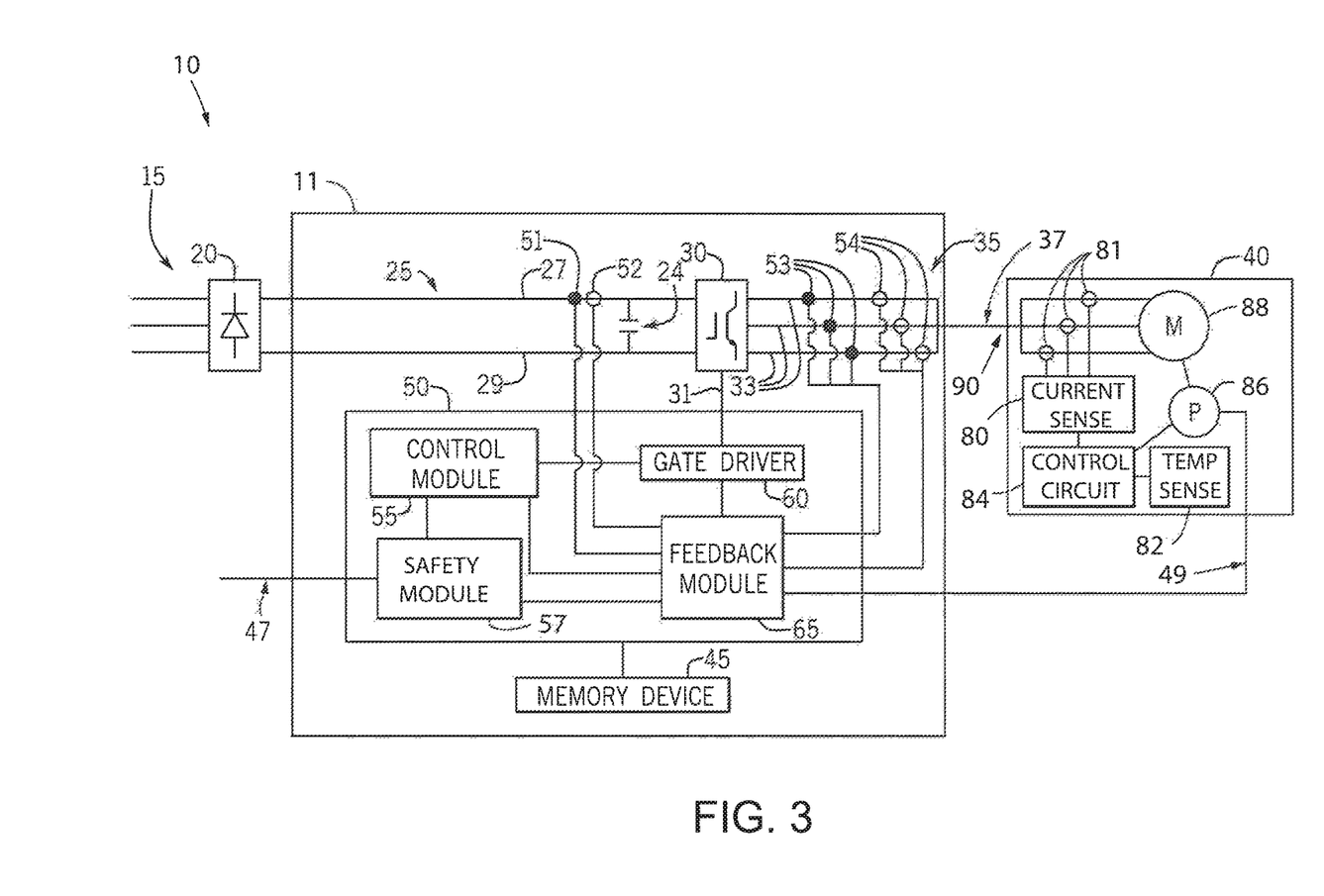
FIG. 3 is a schematic representation of the motor and motor drive according to one embodiment of the present invention.
Figure 7:
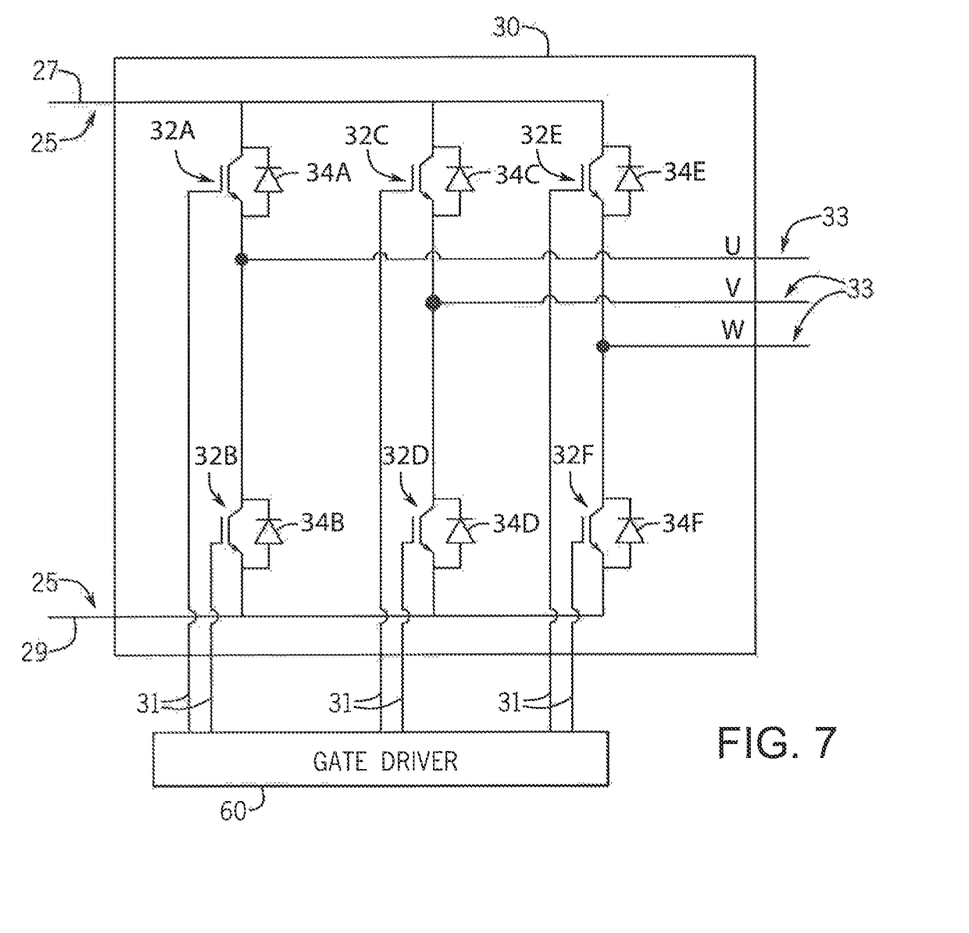
FIG. 7 is a schematic representation of an inverter used in FIGS. 3-5.

According to the embodiment illustrated in FIG. 1, a single motor drive 11 is connected to the front-end rectifier 20. A pair of conductive bus bars extend between the top of the rectifier 20 and the top of the drive 11 to provide the positive and negative rails 27, 29 of the DC bus from the rectifier 20 to the motor drive 11. With reference also to FIG. 3, the motor drive 11 may include a DC bus capacitor 24 connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. Optionally, all or a portion of the DC bus capacitance may be provided in the front-end rectifier 20. The DC bus 25 is connected in the motor drive 11 to an inverter section 30. Referring also to FIG. 7, the inverter section 30 consists of switching elements, such as transistors, thyristors, or SCRs as is known in the art. The illustrated inverter section 30 includes IGBTs 32 and a free-wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 11) and may be, for example, a conductive surface on a circuit board to which the transistors 32 are mounted or a bus bar connected to a terminal from a power module in which the transistors 32 are contained. The output terminals 35 of the motor drive 11 may be connected to the motor 40 via a cable 37 including electrical conductors connected to each of the output terminals 35.

Figure 2:
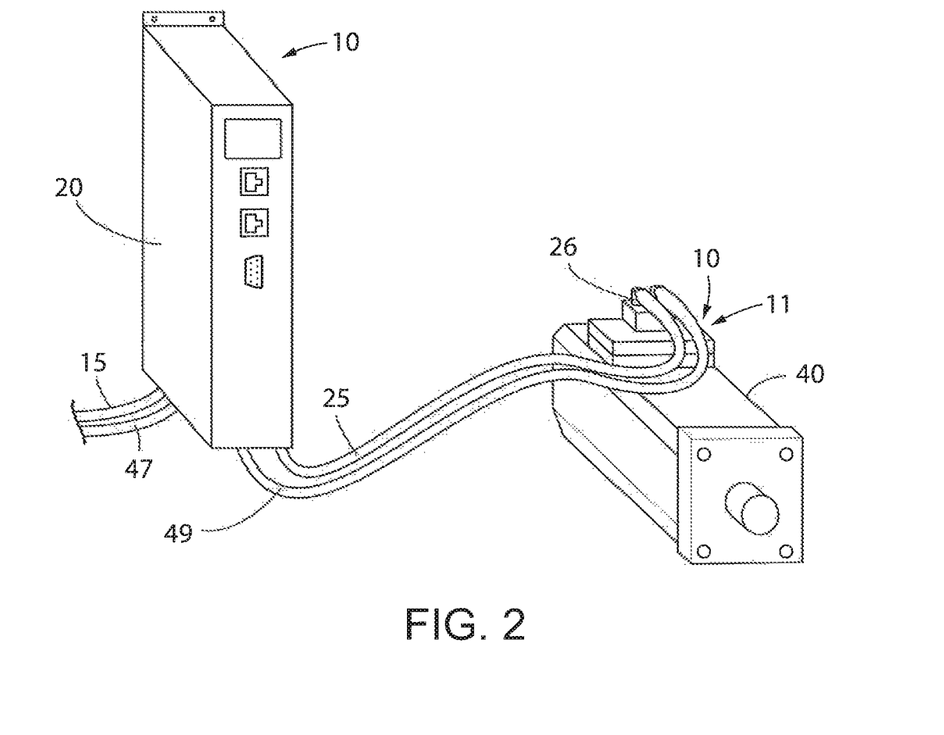
FIG. 2 is an exemplary embodiment of a motor and an integrated motor drive incorporating the present invention.

Turning next to FIG. 2, a second embodiment of a motor controller 10, which may be used in conjunction with the various embodiments of the invention disclosed herein, is illustrated. In a manner similar to the motor controller illustrated in FIG. 1, the motor controller 10 includes a front-end rectifier 20 and a motor drive 11. The front-end rectifier 20 is configured to receive a three-phase AC voltage 15 at an input to the rectifier 20, and to provide a DC voltage on a DC bus 25 as an output of the rectifier 20. The rectifier 20 may include any electronic device suitable for passive or active rectification as is understood in the art. The magnitude of the DC voltage between the negative and positive rails, 29 and 27, is generally equal to the magnitude of the peak of the AC input voltage. One or more motor drives 11 may be connected to the DC bus 25 to receive the DC voltage present on the bus and to use the DC voltage to control one or motors connected to each motor drive 11.

Unlike the motor controller 10 illustrated in FIG. 1, the motor drive 11 illustrated in FIG. 2 is mounted to the motor 40. Just as with FIG. 1, a single motor drive 1 is shown in FIG. 2 being connected to the front-end rectifier 20. A DC bus cable 25 extends between the front-end rectifier 20 and the integrated motor drive 11 to provide the positive and negative rails 27, 29 of the DC bus from the rectifier 20 to the motor drive 11. Optionally, the front-end rectifier may provide DC voltage to multiple integrated motor drives 11 mounted to motors 40 and distributed around the controlled machine or process. Other than the mounting location, the motor drive is configured in a manner similar to the motor drive shown in FIG. 1 and discussed above with respect to FIG. 3. Because the motor drive 11 is mounted to the motor 40, short leads or bus bars may be connected between the output terminals 35 of the motor drive 11 and the stator terminals of the motor 40. Optionally, the stator windings may be connected directly to the output terminals 35 of the motor drive 11.

One or more modules are used to control operation of the motor drive 11. With reference again to FIG. 3, a controller 50 includes the modules and manages execution of the modules. The illustrated embodiment is not intended to be limiting and it is understood that various features of each module discussed below may be executed by another module and/or various combinations of other modules may be included in the controller 50 without deviating from the scope of the invention. The modules may be stored programs executed on one or more processors, logic circuits, or a combination thereof. The controller 50 may be implemented, for example, in one or more microprocessors, application specific integrated circuits (ASICs), field programmable gate arrays (FPGAs), or other such customizable device. The motor drive 11 also includes a memory device 45 in communication with the controller 50. The memory device 45 may include transitory memory, non-transitory memory or a combination thereof. The memory device 45 may be configured to store data and programs, which include a series of instructions executable by the controller 50. It is contemplated that the memory device 45 may be a single device, multiple devices, or incorporated, for example, as a portion of another device such as an application specific integrated circuit (ASIC). The controller 50 is in communication with the memory 45 to read the instructions and data as required to control operation of the motor drive 11.

The controller 50 receives a reference signal identifying desired operation of the motor 40 connected to the motor drive 11. The reference signal may be, for example, a position reference ($\theta^*$), a speed reference ($\omega^*$), or a torque reference ($T^*$). For discussion purposes herein, the reference signal will be considered as a position reference signal ($\theta^*$). The reference signal may be received from another controller, such as a programmable logic controller (PLC), programmable automation controller (PAC) or the like via an industrial network 47. The industrial network 47 may be any suitable network including, but not limited to, Ethernet/IP, DeviceNet, or ControlNet. Although a single cable 47 (see e.g., FIG. 3) is illustrated as representing the network, it is contemplated that the network may be implemented in a redundant manner with parallel network cables, network devices, network interfaces, and the like to achieve a desired reliability and/or safety rating for the system. A safety module 57 executing in the controller 50 may receive the reference signal from the safety network. It is contemplated that the safety module 57 may be a pair of modules executing in a redundant manner on a pair of processors in the controller 50 with a synchronization routine verifying that the same reference signal is received from the network 47 at each of the processors. After performing the safety verification, the safety module 57 will pass the reference signal to a control module 55 to regulate operation of the motor 40 according to the reference signal.

The controller 50 also receives feedback signals indicating the current operation of the motor drive 11. According to the illustrated embodiment, the controller 50 includes a feedback module 65 that may include, but is not limited to, analog to digital (A/D) converters, buffers, amplifiers, and any other components that would be necessary to convert a feedback signal in a first format to a signal in a second format suitable for use by the controller 50 as would be understood in the art The motor drive 11 may include a voltage sensor 51 and/or a current sensor 52 on the DC bus 25 generating a feedback signal corresponding to the magnitude of voltage and/or current present on the DC bus 25. The motor drive 11 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive. A position feedback device 86 such as an encoder or resolver may be connected to the motor 40 to generate a position feedback signal corresponding to an angular position of the motor 40. It is further contemplated that the position feedback device 86 may be a safety rated position feedback device, wherein the safety rated position feedback device may include: dual sensors internal to the device to monitor determine the angular position of the motor, dual channels to pass the angular position information through the device, a safety rated communications protocol, and/or onboard diagnostic routines to verify proper operation of the device.

The controller 50 utilizes the feedback signals and the reference signal to control operation of the inverter section 30 to generate an output voltage having a desired magnitude and frequency for the motor 40. The feedback signals are processed by the feedback module 65 and converted, as necessary, to signals for the control module 55. The control module 55 also receives the reference signal and executes responsive to the reference signal and the feedback signals to generate a desired output voltage signal to a gate driver module 60. The gate driver module 60 generates the gating signals 31, for example, by pulse width modulation (PWM) or by other modulation techniques. The gating signals 31 subsequently enable/disable the transistors 32 to provide the desired output voltage to the motor 40, which, in turn, results in the desired operation of the mechanical load 42 coupled to the motor 40.

In operation, one or more modules executable by the controller 50 are operative to provide a safe limited torque operation of the motor 40 connected to the motor drive 11. The motor drive 11 may receive an input signal indicating that a safe state of operation, such as the safe limited torque operation, is desired. The input signal may be transmitted from another controller such as a PLC, connected to the motor drive 11, via the network 47. Optionally, a safety device, such as a safety mat, a gate switch, a key switch, a light curtain, or the like may detect the presence of a person interacting with the controlled machine or process and generate an input signal that is connected directly to an input on the motor drive 11. When the input signal indicates safe limited torque operation is desired, the motor drive 1 limits the magnitude of current being output to the motor 40 which, in turn, limits the amount of torque being generated by the motor 40.

In order to achieve a desired safety rating the motor drive 11 and motor 40 utilize redundant feedback systems to monitor the magnitude of torque generated by the motor 40.

As discussed above, the controller 50 receives feedback signals such as current feedback signals and position feedback signals corresponding to operation of the motor. The current feedback signals are sampled synchronously in time with the position feedback signals. The position feedback signals are utilized to determine both the angular position of the motor, a mechanical angle, and the electrical angle of the current. The electrical angle of the current is used in combination with the magnitude of the measured currents to determine transformed current values in the d and q axes which, as discussed below, are utilized to determine the torque produced by the motor. Therefore, to improve the accuracy of the transformed current values it is desirable to sample the currents and position feedback signals synchronously with each other.

The present inventors selected the current feedback signals to monitor the magnitude of torque for an improved response time in determining the torque produced by the motor. While position feedback signals may be monitored, and in some applications are utilized, to determine torque output by the motor, position feedback signals introduce some delay in determining the level of torque output by the motor. Utilizing a position feedback signal to monitor for a change in the level of torque output by the motor first requires detecting a change in the speed of the motor. The angular position provided by the position feedback signal is monitored over at least two sampling periods to determine an angular velocity over the duration. A change in angular velocity, therefore, requires monitoring over a third sampling period to detect a change in angular velocity. Further, the change in angular velocity is a result of increasing current creating a change in torque applied to the motor and the motor, in turn, changing speed as a result of the change in torque. Thus, detecting a change in torque as a result of monitoring the position feedback signal inherently includes delays in the calculation resulting from waiting for the change in current to create a change in torque generated by the motor and, thereby changing the angular velocity of the motor. In contrast, monitoring the current feedback allows the motor drive 11 to detect a change in the level of torque being supplied to the motor 40 as the torque is being generated by the motor. An increase in current will result in an increase of torque generated by the motor and, subsequently, a change in the angular velocity of the motor. However, by monitoring the current feedback, the motor drive 11 is able to detect the change in torque before the change in torque could be determined by monitoring changes in angular velocity of the motor.

In many applications, a motor drive 11 includes current sensors 54 to measure only two phases of current output to the motor 40. Because the motor drive 11 is configured to output a balanced three-phase current, the sum of the currents adds up to zero. Thus, the magnitude of current in the third phase can be determined by subtracting the magnitude of the two measured phases from zero. Using two sensors 54 in a motor drive 11 reduces cost, requires less space within the drive, and, additionally, avoids potential challenges in regulating the current output to the motor if the motor current appears unbalanced to the motor controller, for example, due to an offset present in a feedback signal, precision of an analog to digital conversion, and the like that may otherwise result in the sum of all three phases being something other than zero. If three sensors 54 are utilized for regulating the current output to the motor 40, the regulator may attempt to eliminate measurement and/or feedback offsets or tolerance errors creating an instability in the current regulation.

In this application, however, the reliability of the motor drive 11 and, therefore, the safety rating may be increased by utilizing a separate current sensor 54 on each phase of the output 35 supplied to the motor 40. The three phases may be added together to verify that the current is balanced within an acceptable tolerance level. Thus, the motor drive 11 is able to perform a check on whether the current sensors 54 are operating as expected. Further, if one sensor 54 fails, the other two may still be utilized to measure current output to the motor until the failed sensor 54 is repaired or replaced. Thus, the motor drive 11 is able to continue operation even if there is a single failure in one of the three current sensors.

To further increase the safety rating, a second set of current sensors 81 are provided in the system. The second set of current sensors 81 also measure current in all three phases output to the motor 40. With reference to FIG. 3, a first embodiment of the invention includes the second set of current sensors 81 within the motor 40. According to the illustrated embodiment, the sensors 81 are transducers, such as a coil or current measurement resistor that generate a voltage and/or a current signal corresponding to a magnitude of current being sensed. The illustrated motor 40 also includes a current sense circuit 80 which receives the signals from the sensors and may perform, for example, filtering or analog-to-digital conversion on the signals from the sensors or additionally may regulate the timing at which sampling occurs. Although illustrated as separate elements, it is contemplated that a portion or the entirety of the current sense circuit 80 may be incorporated into a single housing with the transducer to provide a current sensor.

The measured current in each phase of the motor 40 is, in turn, provided to a control circuit 84 mounted within the motor. According to one embodiment of the invention, the control circuit 84 is operative to manage data collected within the motor 40 and facilitate transmission of the data back to the motor drive 11. The control circuit 84 may include a non-transitory memory to store parameters, control instructions, a microprocessor to execute instructions, logic circuits to perform specific functions, one or more buffers, communication circuitry, and the like, or a combination thereof. The control circuit 84 may also receive a temperature feedback signal from a temperature sense circuit 82 which includes a temperature transducer and any necessary circuit elements to filter, process, and/or transmit the temperature signal from the transducer to the control circuit 84. The control circuit 84 is further in communication with the position sensor 86 connected to the motor 40. According to one embodiment of the invention, the control circuit 84 receives position feedback signals from the position sensor 86 and assembles the current feedback signals, temperature feedback signals, and position feedback signals into data packets for communication to the motor drive 11. A communication cable 49 is connected between the motor 40 and the motor drive 11 and the control circuit 84 formats and transmits data packets between the motor 40 and the motor drive 1 with the feedback information. Alternately, the communication cable 49 and the power cable 37 may be integrated into a single cable extending between the motor drive 11 and the motor 40.

According to another embodiment of the invention, the position sensor 86 may include a communication interface by which position information and additional data may be transmitted to the motor drive 11. Exemplary interfaces include, but are not limited to the EnDat®, HIPERFACE DSL®, or SCS open Link® interfaces utilized in various encoders. The control circuit 84 may transmit the current feedback information and the temperature feedback information to the position sensor 86 which, in turn, includes the feedback information as additional data when position feedback information is transmitted to the motor drive 11. According to either embodiment, the motor drive 11 receives the values of the current measured for each phase of the motor 40 by the second set of current sensors 81 and the measured values of the temperature in the motor 40 in addition to position feedback information from the motor 40.

Figure 4:
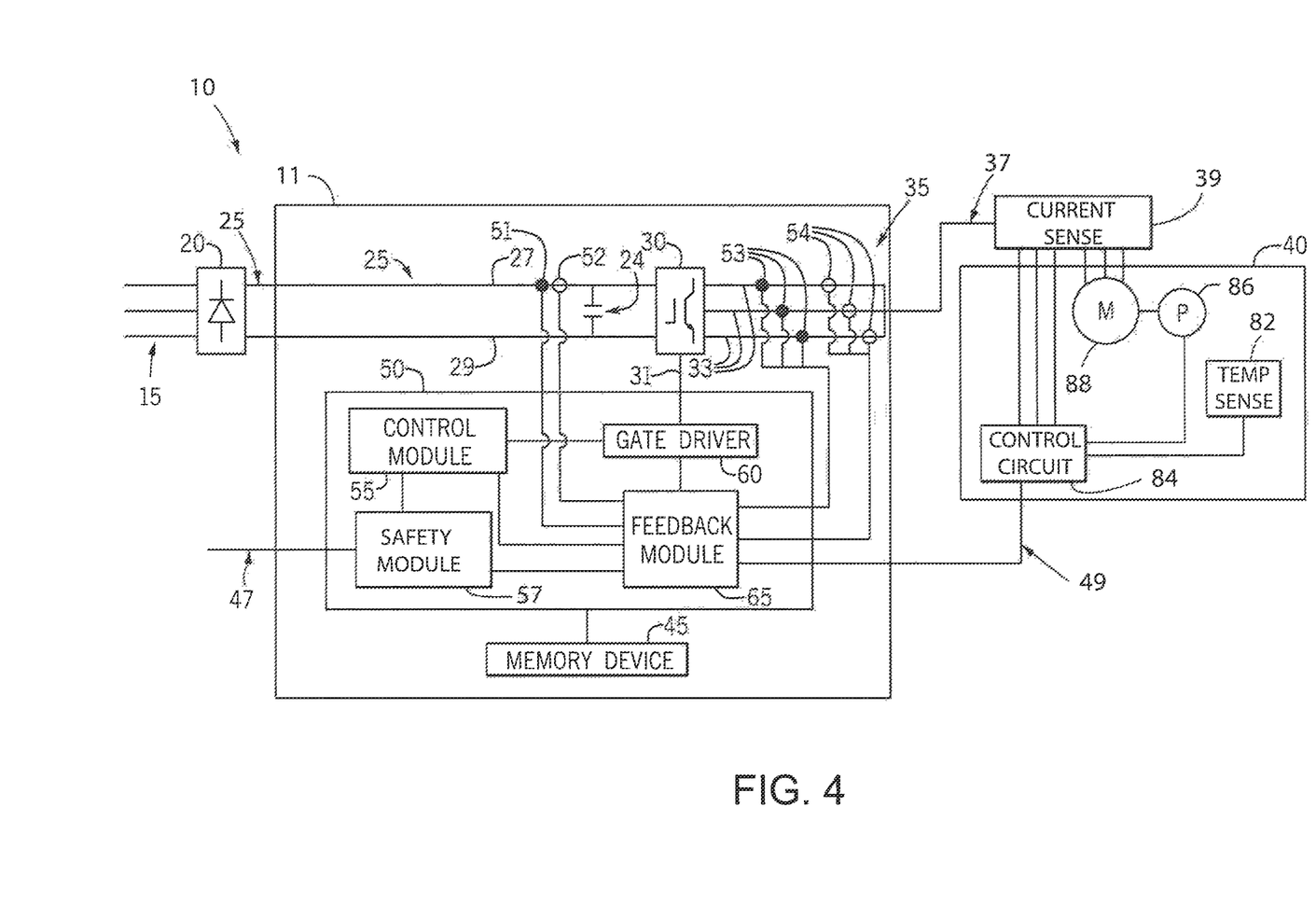
FIG. 4 is a schematic representation of the motor and motor drive according to another embodiment of the present invention.

Turning next to FIG. 4, still another embodiment of the invention is illustrated. Rather than including the current sensors within the motor 40, it is contemplated that the current sensors 81 and the current sense circuit 80 are included within a connector 39 for the power cable 37 extending between the motor 40 and the motor drive 11. The second set of current sensors are able to measure the current supplied to each phase of the motor via the power cable 37 and provide the current feedback signals to the control circuit 84. Optionally, it is further contemplated that the control circuit may additionally be included within the connector 39 of the cable 37. The control circuit 84 may be configured to receive temperature information from a temperature sensor 82 within the motor 40 and/or position feedback information from the position sensor 86. The connector 39 may be a plug, receiving the power cable 37 at one end and terminals for connection or insertion into a connector on the motor 40 at the other end. Optionally, the connector 39 may be a junction box mountable to the motor 40 and configured to be connected to the power cable 37 and the motor 40. Providing the second set of current sensors 81 and/or the control circuit 84 external to the motor 40 allows the sensors 81 to be added to existing motor 40 as an upgrade to achieve a desired safety rating in an application.

Figure 5:
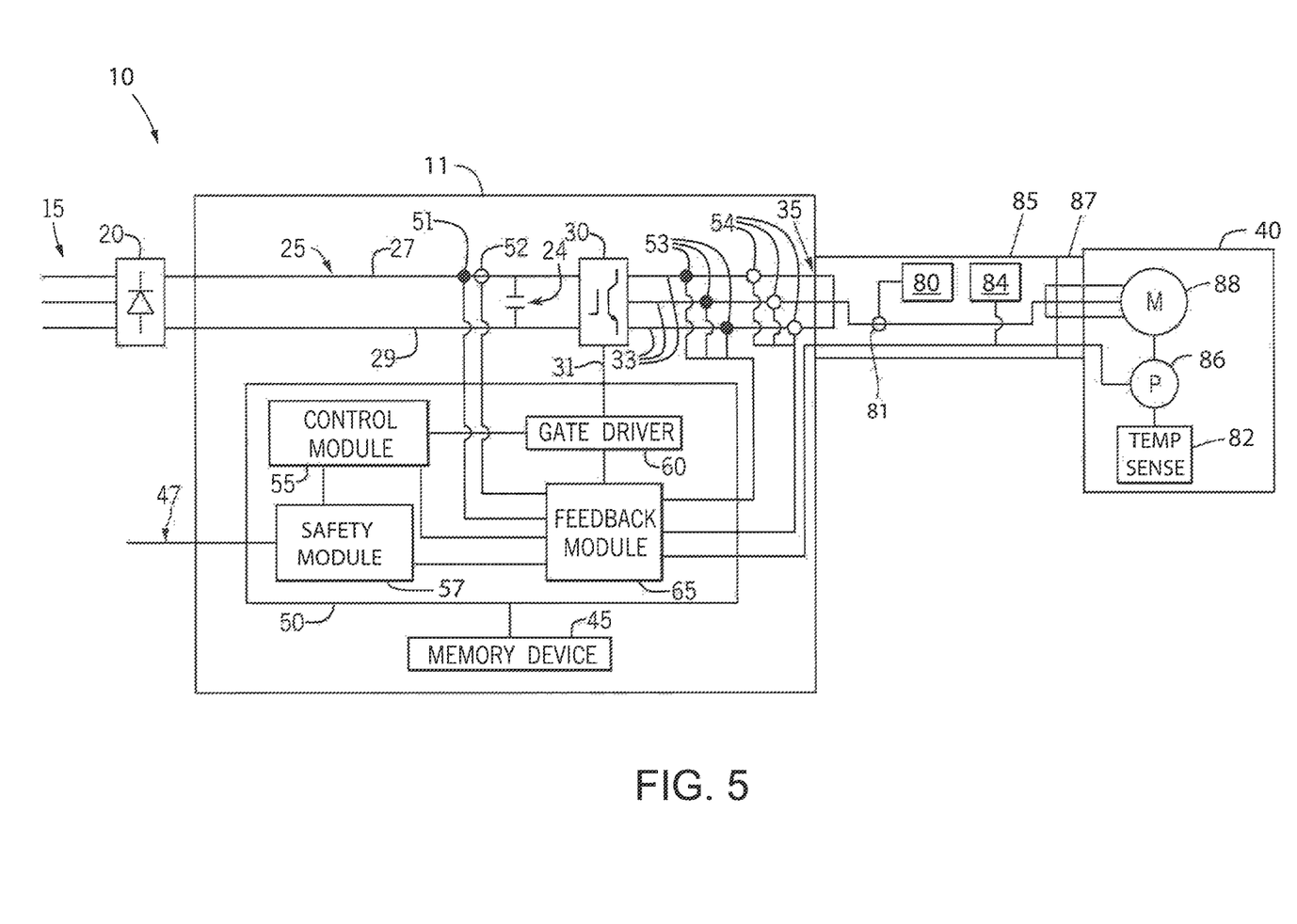
FIG. 5 is a schematic representation of the motor and motor drive according to still another embodiment of the present invention.

According to still other embodiments of the invention, it is contemplated that the second set of current sensors, current sense circuit, and/or control circuit 84 be located in a connector for the power cable 37 at the output of the motor drive 11 or in a junction box mounted at any suitable location between the motor drive 11 and the motor 40. With reference, for example, to FIG. 5 a hardware dongle 85 or other such inline cable or device is provided between the motor drive 11 and the motor 40. The hardware dongle 85 includes a current sense circuit 80, current sensors 81, and a control circuit 84. Although illustrated as a single sensor, it is contemplated that three separate current sensors 81 may be provided with a separate sensor on each phase of the power output to the motor. The three phases between the motor drive 11 and the motor 40 are collapsed into a single line within the dongle 85 for ease of illustration. As illustrated, the hardware dongle 85 plugs into the output 35 of the motor drive 11 and is further configured to conduct position feedback information between the motor 40 and the motor drive. A single cable 87 plugs into the opposite side of the dongle 85 and includes conductors for the power from the motor drive 1 to the motor 40 as well as communication conductors between the position feedback device 86 and the motor drive. The three-phase output from the motor drive 11 is connected within the motor 40 to the stator of the motor body 88 itself to control rotation of the motor 40. The current sense circuit 80 may operate in a similar manner as discussed above to sample the current supplied to each phase of the motor 40. The control circuit 84 may be configured to intercept communication packets from the position feedback device 86 and insert current measurements in the communication packets before transmitting the communication packets to the motor drive 11. Alternately, the control circuit 84 may monitor communication traffic from the position feedback device 86 to the motor drive 11 and allow those packets to pass through the dongle 85 and intersperse additional communication packets with the measured current feedback data.

Figure 8:
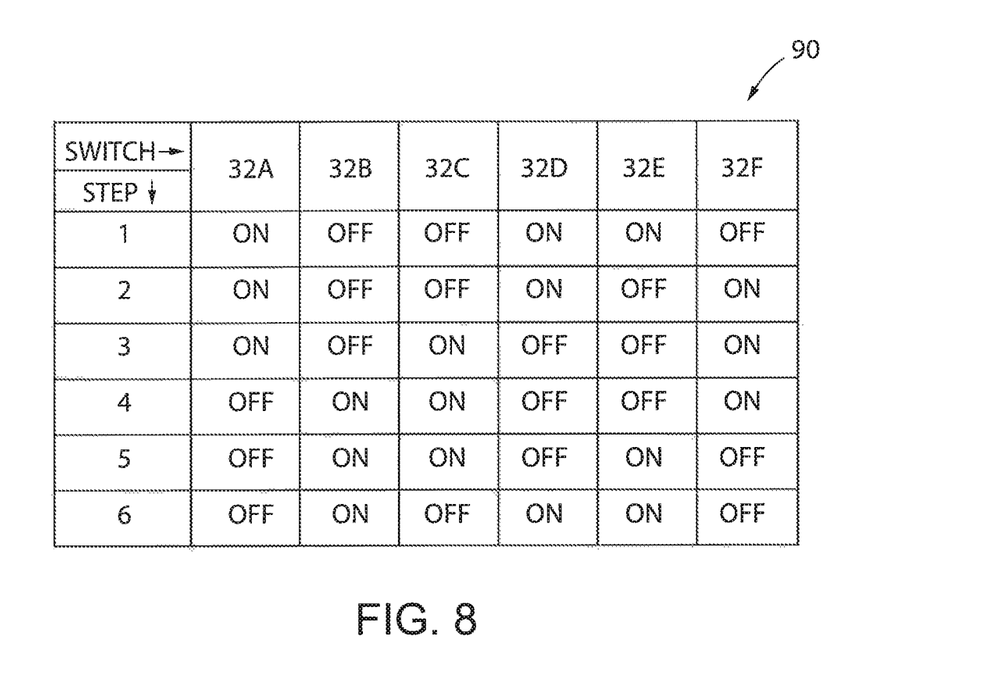
FIG. 8 is a tabular representation of gating signals provided to the inverter of FIG. 7 according to one embodiment of the invention.

According to yet another embodiment of the invention, it is contemplated that the motor drive 11 may be configured to generate a second set of measured current data which is provided to the control circuit 50 in place of measured current data from a second set of current sensors 81. The control module 55 may receive current feedback signals from the current sensor 52 on the DC bus 25 which indicate the amount of current conducted on the DC bus. The current conducted from the DC bus 25 is provided to the motor via the inverter section 30 of the motor drive 11. With reference to FIG. 8, an exemplary look-up table 90 is illustrated that defines the state of the transistors 32 at any given instant when the motor drive 11 is supplying current to the motor 40, where the state of each transistor 32 corresponds to the switching signal 31 supplied to the transistor. Three of the transistors 32 will be on while three of the transistors will be off. Based on which set of transistors is conducting, the motor drive 11 may reconstruct the current flowing in each phase of the motor 40. A portion of the current measured on the DC bus 25 will flow in each phase, with a different portion flowing in each phase as a function of the state of each transistor 32. The illustrated table 90 is a simplified six-step switching function. It is contemplated that various other look-up tables may be provided without deviating from the scope of the invention. The control module 55 samples the magnitude of current present on the DC bus 25 synchronously with sampling the magnitude of current present at the output 35 of the motor drive and reconstructs a second set of current feedback signals for the output as a function of the sampled DC bus current and the look-up table 90 stored in the memory device 45 of the motor drive 11. The reconstructed second set of current feedback signals may be provided to the feedback module 65 in place of signals from a second set of current sensors 81 or utilized directly within the control module 55 in place of feedback values obtained via the second set of current sensors 81.

Figure 9:
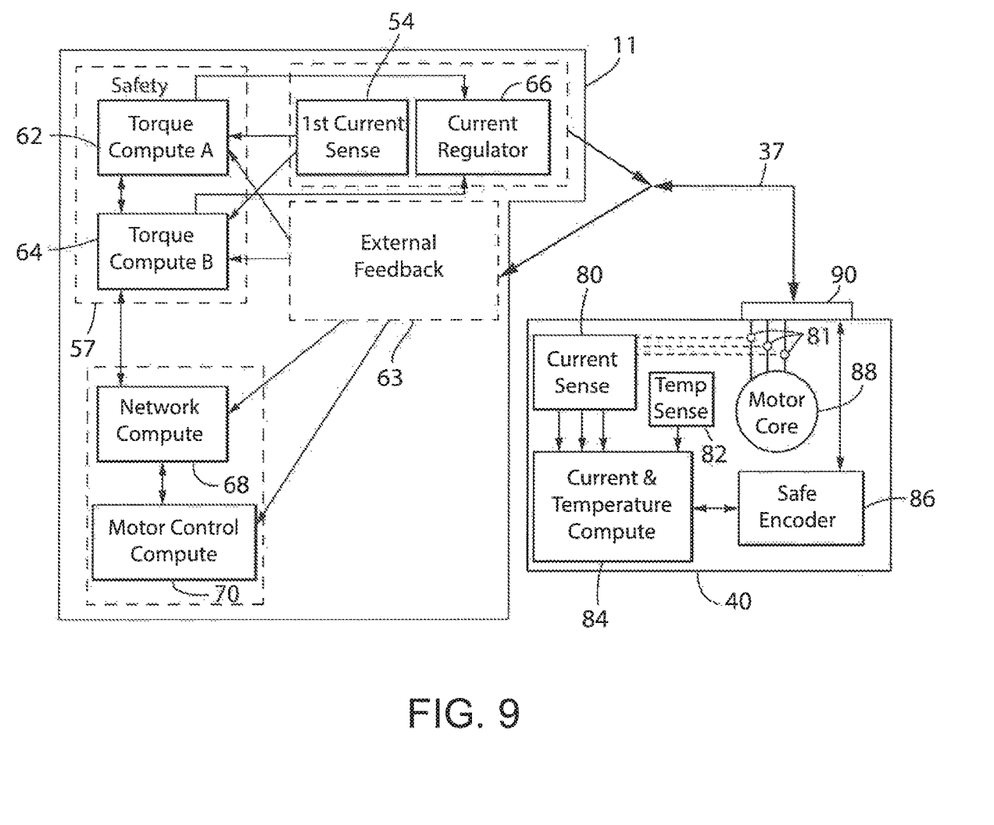
FIG. 9 is a block diagram representation of the motor and motor drive of FIG. 3.

With the current feedback signals from both the first set of current sensors 54 and the second set of current sensors 81, the motor drive 1 may independently calculate two different values of the torque being generated in the motor 40. With reference also to FIG. 9, it is contemplated that the safety module 57 is configured to execute a first torque computation module 62 and a second torque computation module 64. To further reduce the likelihood of a single failure causing undesired operation of the motor, the controller 50 may include a first processor and a second processor, where the first processor executes the first torque computation module 62 and the second processor executes the second torque computation module 64. If either processor fails, the other processor is still able to determine a level of torque being generated by the motor 40 and allow for a controlled shut down of the motor 40. Optionally, both processors may execute both torque computation modules 62, 64 in a redundant manner and compare the torque values output from the modules on each of the respective processors to verify the computations.

Figure 10:
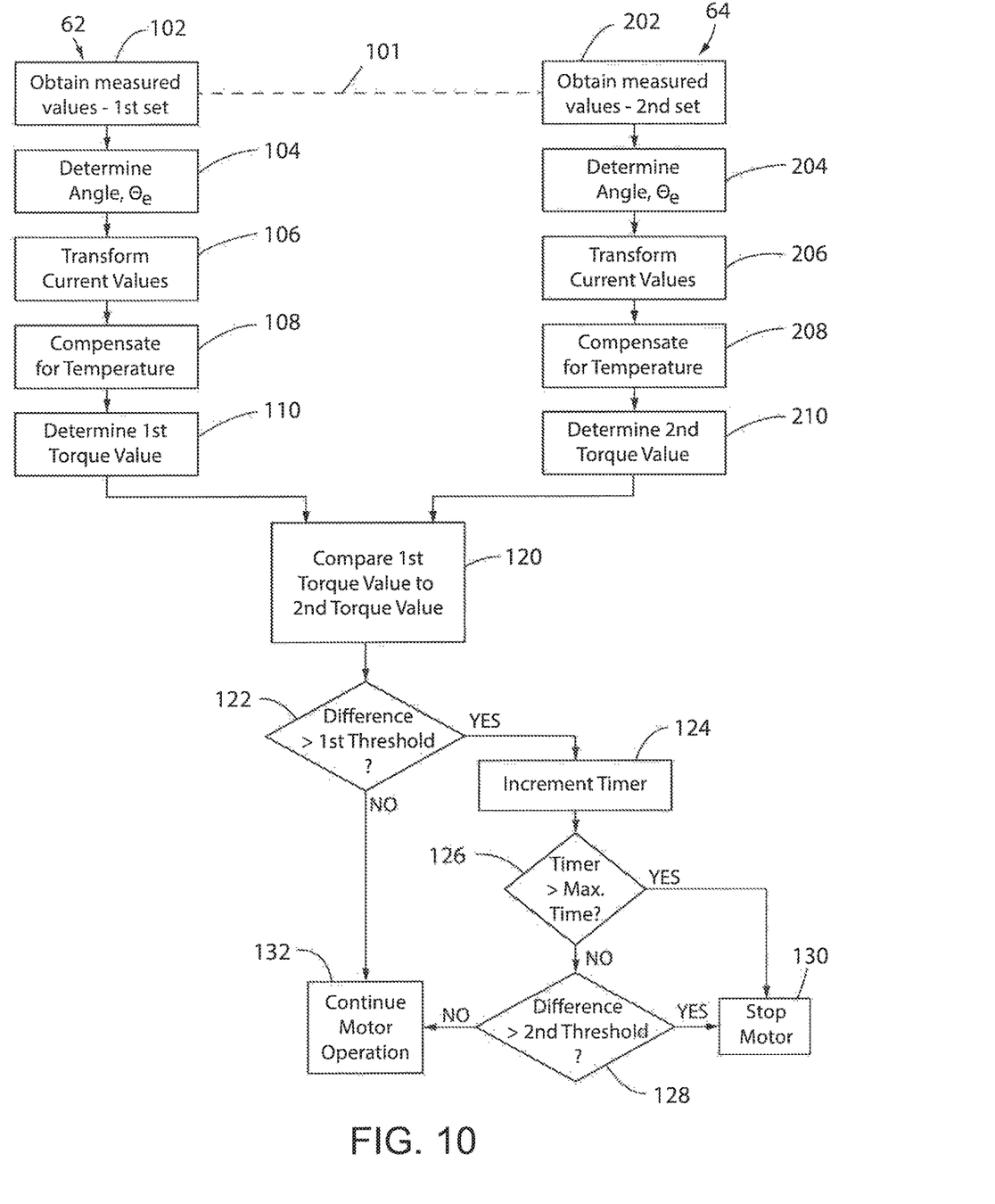
FIG. 10 is a flow diagram illustrating the steps for implementing safe limited torque operation in the motor according to one embodiment of the invention.

Turning next to FIG. 10, a flow diagram illustrates the steps taken in the first torque computation module 62 and in the second torque computation module 64, according to one embodiment of the invention, to provide a safe limited torque operation in the motor drive 11. The initial steps of FIG. 10 are used to determine the torque being produced in the motor using the two different torque computation modules 62, 64. Each of the torque computation modules 62, 64 utilizes the magnitude of current output to the motor 40 to independently determine a value of torque produced by the motor 40. As shown in step 102, the first torque computation module 62 uses the values of current measured with the first set of current sensors 54. Similarly, the second torque computation module 64 uses the values of current measured with the second set of current sensors 81, as shown in step 202.

As further indicated in steps 102 and 202, each set of current sensors 54, 81 must sample the current in each phase of the motor in order to obtain the first and second set sets of measured value of the current, respectively. The current output in each phase of the motor 40 is an alternating current, varying between a maximum positive value and a maximum negative value. Additionally, the voltage, and resulting current, in each phase of the motor is generated via a modulation technique, such as pulse width modulation, as previously discussed. Thus, the voltage supplied to each phase of the motor is alternately connected to either the positive rail 27, the negative rail 29, or a common connection. Although the change in the resultant current is limited as a result of the inductance in the winding of each phase of the stator, the values of the current output to the motor are constantly changing due to the alternating nature, the modulation of the motor drive, electromagnetic interference between phases, and numerous other sources. Consequently, in order to independently sample the current in each phase of the motor and to then independently determine values of torque produced by the motor at any instant in time from the two different sets of samples, it is desirable to synchronize the instant at which sampling of the current occurs in each set of current sensors. With reference to FIG. 10, a dashed line 101 is indicative of a synchronizing signal 101 being passed between the sampling circuits for the first and second sets of sensors in order to obtain measured values of the current in tandem for each phase of the motor 40.

According to one embodiment of the invention, the motor drive 11 includes a clock circuit that periodically generates a pulse to the position encoder 86 to transmit the position feedback information to the motor drive 11. Optionally, the motor drive 11 may include a dedicated feedback circuit configured to communicate via the interface for the position feedback device 86. The dedicated feedback circuit may generate an initial control signal to initiate a communication cycle from the encoder 86 to the motor drive 11. As one step in the communication cycle, the encoder 86 samples the data and writes the data to a memory location within the encoder for transmission to the motor drive 11. Similarly, the encoder 86 may transmit the control signal to the current sense circuit 80 to cause the current on each phase of the motor 40 to be sampled by the second set of current sensors 81. A predefined delay time may exist between when the control signal is generated and when the current is sampled, including, for example, propagation delay in transmission, control sequence delays based on the order of execution of control instructions, and the like. The motor drive 11 may be configured to generate the control signal to initiate the current sampling by the second set of current sensors in the motor 40 at a first time and to initiate current sampling of the first set of current sensors 54 within the motor drive 11 at a second time, where the second time is delayed by the predefined delay time such that the first and second current sensors sample the first and second values of current in tandem. With reference again to FIG. 10, the pulse from the clock circuit or the signal to the encoder to initiate sampling in the motor correspond to the synchronizing signal 101 illustrated in the flow diagram to cause the first set of current values and the second set of current values to be obtained in tandem by the respective set of current sensors.

With reference to steps 104-110 of FIG. 10, the first torque computation module 62 determines a first value of torque produced by the motor 40. At step 104, the electrical angle, $\theta_e$, of the motor is determined. The electrical angle, $\theta_e$, is used in step 106 to transform the first set of current values from the measured three-phrase reference from to a two-phase reference frame, such as the d-q reference frame. In the d-q reference frame, a first current, $I_q$, is defined as a torque producing current and is regulated to achieve a desired level of torque in the motor 40 and a second current, $I_d$, is defined as a flux producing current and is regulated to achieve a desired level of flux across the air gap between the stator and the rotor in the motor 40. At step 108, the first torque computation module 62 uses a measured value of temperature in the motor to compensate parameters used to determine the first torque value, and at step 110, the first torque computation module 62 determines a first value of the torque produced by the motor 40 according to a first function.

With reference to steps 204-210 of FIG. 10, the second torque computation module 64 determines a second value of torque produced by the motor 40. At step 204, the electrical angle, $\theta_e$, of the motor is determined. The electrical angle, $\theta_e$, is used in step 206 to transform the first set of current values from the measured three-phrase reference from to a two-phase reference frame, such as the d-q reference frame. In the d-q reference frame, a first current, $I_q$, is defined as a torque producing current and is regulated to achieve a desired level of torque in the motor 40 and a second current, $I_d$, is defined as a flux producing current and is regulated to achieve a desired level of flux across the air gap between the stator and the rotor in the motor 40. At step 208, the second torque computation module 64 uses a measured value of temperature in the motor to compensate parameters used to determine the second torque value, and at step 210, the second torque computation module 64 determines a second value of the torque produced by the motor 40 according to a second function.

According to one aspect of the invention, the first function, executed by the first torque computation module 62, and the second function, executed by the second torque compensation module 64, may be identical. Two torque computation modules executing on separate processors may be used to verify the measurements from each set of current sensors. If the two functions are identical, that two modules should generate the same results with the same measured values. Verification of the computed torque values, as discussed further below, will provide increased reliability of the execution of each torque compensation module.

According to another aspect of the invention, it is contemplated that the first and second functions, used by the first and second torque computation modules 62, 64, respectively, are different from each other. Use of diverse functions for determination of the torque values provides still an additional level of reliability of the system. If both torque computation modules 62, 64 use the same function, as indicated above, an error in one value of the calculation will generate an error in the calculation of the torque value. While comparison of the two outputs can verify that the measured values correspond to each other, if there is an error in the output of the calculation, both modules will generate the same erroneous value. By providing two different functions in the torque compensation modules, an error in a value may still cause an erroneous output in one or both of the calculations. However, the different functions are unlikely to generate the same erroneous output. It is more likely that only one function will calculate an erroneous value at a time or, alternately, both functions may return an erroneous value, but the two values will be different as a result of the differing functions. Thus, utilizing diverse functions for each of the two torque computation modules 62, 64 provides an increased reliability and, therefore, improved safety level in the safe limited torque operation.

It is contemplated that the first torque computation module 62 may utilize the flux linkages in the motor 40 to determine the first torque value. As illustrated in equation 1 below, the current values and the flux linkage values in the d-q reference frame may be used to determine a value of torque being produced by the motor 40.

$$T_1 = \frac{3P}{2}(\lambda_d I_q - \lambda_q I_d) \quad (1)$$

where:
$T_1$ is the first torque value,
P is the number of poles in the motor,
λ is the value of the flux linkage in either the d or q axis, and
I is the value of current in either the d or q axis.

As the temperature varies in the motor 40, the flux produced within the motor also varies. As a result, the motor drive 11 may include a compensation routine for the flux linkage values. At step 108, the first torque computation module executes the compensation routine for the flux linkage values to adjust the value of the flux linkage as a function of the temperature in the motor 40. The temperature value measured by the temperature sensor 82 in the motor may be used to raise or lower the flux linkage value by a predefined amount, by a predefined percentage, according to a look-up table, according to a stored temperature compensation function, or the like. The compensated flux linkage value is then used in equation 1 above to determine the first value of torque in the motor.

It is contemplated that the second torque computation module 64 may utilize a torque constant, Kt, of the motor 40 to determine the second torque value. As illustrated in equation 2 below, the torque constant is a predefined value for a motor and is multiplied by the value of current in the q axis to determine a value of torque being produced by the motor 40

$$T_2 = K_t \cdot I_q \quad (2)$$

where:
$T_2$ is the second torque value,
Kt is a torque constant defined for the motor, and
$I_q$ is the current in the q axis.

The torque constant, Kt, corresponds to the design of the motor 40. The torque constant defines the amount of torque a motor is able to output for a given amount of current present in the motor. Motor design criteria such as the magnetic field strength in the motor, the number of turns in the winding, the armature length, and the like determine the torque constant. Some of these values, such as the magnetic field strength vary as a function of the temperature in the motor 40. At step 208, the second torque computation module compensates the torque constant as a function of the temperature in the motor 40. The temperature value measured by the temperature sensor 82 in the motor may be used to raise or lower the torque constant by a predefined amount, by a predefined percentage, according to a look-up table, according to a stored temperature compensation function, or the like. The compensated torque constant is then used in equation 2 above to determine the second value of torque in the motor.

Turning again to FIG. 10, after the first and second values of the torque generated in the motor 40 are determined, steps 120-130 operate to verify that the two values correspond to each other. It is contemplated that either the first processor, executing steps 102-110, may perform the verification, or the second processor, executing steps 202-210, may perform the verification. Optionally, both the first and second processors may perform the verification and compare the results obtained by each processor to further improve the reliability of the system. At step 120, the first value of torque is compared to the second value of torque. A difference between the two values is compared to a predefined threshold at step 122. The predefined threshold allows for a small variation between the two values without indicating an error condition, where it is contemplated that the two values may be allowed to vary from each other by up to ten percent of the measured value before starting the timer. If the two torque values are less than the predefined threshold, the motor drive 11 continues operation of the motor 40 according to the present command, as shown in step 132. If, however, the two torque values exceed the predefined threshold, the motor controller increments a clock, a counter, or a timer as shown in step 124. At step 126, the current value of the timer is compared to a maximum allowed duration for the two values to be varying from each other, where it is contemplated that the two current values may be allowed to differ from each other beyond the first threshold for tens or hundreds of milliseconds. If the two values have differed from each other for the maximum allowed duration, the motor drive 11 brings the motor to a stop as shown in step 130. Steps 122, 124, 126, and 130 allow the two values to drift apart a small amount for a short duration without generating a fault message or bringing the motor to a stop. If the two values differ from each other by an amount greater than a second threshold, such as a twenty percent difference in the measured values, as shown in step 128, the motor drive 11 may also bring the motor to a stop. Steps 128 and 130 allow the motor controller to stop the motor immediately upon the two values drifting apart by too great a value without waiting for the duration of the timer indicated in steps 124 and 126. If the two values of torque differ by an amount greater than the first threshold, but less than the second threshold, and the timer has not yet expired, the motor controller continues operation of the motor, according to step 132.

The first and second torque computation modules 62, 64 and the steps illustrated in FIG. 10 may be used in conjunction with an input signal that indicates a safe operating state is desired to provide one embodiment of a safe limited torque function in the motor drive 11. As previously indicated, a safety device, such as a safety mat, a gate switch, a key switch, a light curtain, or the like may detect the presence of a person interacting with the controlled machine or process and generate the input signal indicating that a safe operating state is desired. In one safe operating state, safe limited torque operation is desired. The motor drive 11 sets a limit on the magnitude of current being output to the motor 40 which, in turn, limits the amount of torque being generated by the motor 40. While the input signal is present, indicating that operation of the motor 40 in the safe operating state is desired, the safety module 57 executes the first and second torque computation modules 62, 64 as described above. The two modules are used to provide a verified value of the torque being produced by the motor 40. If the verified value of torque either exceeds the first threshold for the predefined duration or exceeds the second threshold, the safety module 57 executes a safe torque off sequence to stop operation of the motor 40, where the safe torque off removes power from the motor 40 and/or de-energizes brake coils, if present, for the motor 40, thereby setting the respective brake.

According to another aspect of the invention, it is contemplated that one of the torque computation modules may be configured to execute within the motor 40. The first processor executing the first torque computation module 62 of the safety module 57 may be a processor within the motor drive 11. A second processor executing the second torque computation module 64 of the safety module 57 may be a processor on the control circuit 84 within the motor 40. The second set of current transducers 81 may receive a synchronizing sampling signal from the motor drive 11 such that the two sets of current values are measured in tandem. However, rather than transmitting the current values back to the motor drive, the control circuit 84 within the motor 40 may receive the measured motor temperature and execute one function to determine a value of the torque being generated by the motor 40. The second value of torque is transmitted back to the motor drive 11 to be compared to the first value of torque, as described above, rather than transmitting the measured current value.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for providing a safe limited force producing power in a motor, the method comprising the steps of:
    measuring a first value of a current present in each phase of a stator of the motor with a first set of current sensors;
    determining a second value of the current present in each phase of the stator of the motor, wherein determining the second value of the current present in each phase of the stator is synchronized in time with measuring the first value of the current present in each phase of the stator;
    determining a first value of a force produced by the motor as a first function of the value of the current present in each phase of the stator;
    determining a second value of the force produced by the motor as a second function of the value of the current present in each phase of the stator, wherein:
        the first function is different than the second function;
        the first function uses the first value of the current, and the second function uses the second value of the current;
    receiving an input signal, corresponding to a safe state of operation of the motor, at a motor drive, wherein the motor drive is operatively connected to control operation of the motor; and
    responsive to receiving the input signal, the motor drive is operative to:
        limit the current output to the motor,
        compare the first value of the force to the second value of the force, and
        when the first value of the force differs from the second value of the force by more than a predefined value, stop operation of the motor, wherein the first set of current sensors is present within the motor drive.

2. The method of claim 1 further comprising the steps of measuring a temperature in the motor;
    transmitting the measured temperature to the motor drive; and
    compensating the first and second values of the force in the motor drive as a function of the temperature measured in the motor.

3. The method of claim 1 wherein the second value of the current present in each phase of the stator of the motor is determined by measuring the value of the current present in each phase with a second set of current sensors.

4. The method of claim 3 wherein the second set of current sensors is present in the motor.

5. The method of claim 4 wherein the second value of the current is transmitted to the motor drive and wherein the motor drive is operative to determine the second value of the three produced by the motor.

6. The method of claim 4 wherein the second value of the force produced by the motor is determined by a control circuit in the motor and the second value of the force is transmitted to the motor drive.

7. The method of claim 3 wherein the second set of current sensors is present in a connector for a power cable connected between the motor drive and the motor.

8. The method of claim 1 wherein the second value of the current present in each phase of the stator of the motor is determined by the following steps:
    measuring a value of the current present on a DC bus in the motor drive,
    reading a look-up table which defines Which phase of the motor is conducting as a function of a plurality of gating signals controlling operation of an inverter section in the motor drive; and
    reconstructing the value of the current present in each phase of the stator as a function of the value of current measured on the DC bus and of the plurality of gating signals in the look-up table.

9. A system for providing a safe limited force producing power, comprising:
    a motor, including a stator, a rotor, and a housing in which the stator and rotor are mounted; and
    a motor controller operatively connected to control operation of the motor, the motor controller including:
        a first set of current sensors operative to measure a first value of a current present in each phase of the stator; and
        at least one processor operative to:
            sample a first value of the current present in each phase of the stator from the first set of current sensors,
            receive a second value of the current present in each phase of the stator from a second set of current sensors, wherein the second set of current sensors are external to the motor controller and wherein a sampling circuit operatively connected to the second set of current sensors samples the second value of the current synchronously with the processor sampling the first value of the current, determine a first value of a force produced by the motor as a first function of the value of the current present in each phase of the stator, determine a second value of the force produced by the motor as a second function of the value of the current present in each phase of the stator, wherein the second function is different than the first function, compare the first value of the force to the second value of the force in the motor drive, and when the first value of the force differs from the second value of the force by more than a predefined value, stop operation of the motor.

10. The system of claim 9 wherein the sampling circuit and the second set of current sensors are each present in the housing of the motor.

11. The system of claim 9 wherein the sampling circuit and the second set of current sensors are each present in a connector for a power cable connected between the motor drive and the motor.

12. The system of claim 9 further comprising a temperature sensor mounted in the motor to generate a temperature signal corresponding to a temperature in the stator of the motor, wherein the temperature signal is transmitted to the motor controller and wherein the at least one processor is further operative to compensate the first and second values of the force as a function of the temperature signal.

13. A method for providing a safe limited force producing power in a motor, the method comprising the steps of:

receiving a first value of a current present in each phase of a stator of the motor at a motor drive, wherein the first value of the current is measured with a first set of current sensors present in the motor drive and wherein the motor drive is operatively connected to control operation of the motor;

determining a second value of the current present in each phase of the stator of the motor at the motor drive, wherein determining the second value of the current present in each phase of the stator is synchronized in time with measuring the first value of the current present in each phase of the stator;

determining a first value of a force produced by the motor as a first function of the value of the current present in each phase of the stator;

determining a second value of the force produced by the motor as a second function of the value of the current present in each phase of the stator, wherein:

the first function is different than the second function,
the first function uses the first value of the current, and
the second function uses the second value of the current;

comparing the first value of the force to the second value of the force in the motor drive, and stopping operation of the motor with the motor drive when the first value of the force differs from the second value of the force b) more than a predefined value.

14. The method of claim 13 further comprising the steps of:

transforming the first value of the current at the motor drive from a three-phase reference frame to a two-phase reference frame to obtain a first transformed current value; and determining a value of flux linkages in the motor, wherein the first function determines the first value of force as a function of the first transformed current value and the value of flux linkages in the motor.

15. The method of claim 14 further comprising the steps of:

measuring a temperature in the motor;
transmitting the temperature measured in the motor to the motor drive; and
compensating the value of flux linkages in the motor as a function of the temperature measured in the motor.

16. The method of claim 13 further comprising the step of transforming the second value of the current at the motor drive from a three-phase reference frame to a two-phase reference frame to obtain a second transformed current value, wherein the second function determines the second value of force as a function of the second transformed current value and of a torque constant defined for the motor.

17. The method of claim 16 further comprising the steps of measuring a temperature in the motor;
transmitting the temperature measured in the motor to the motor drive; and
compensating the torque constant in the motor as a function of the temperature measured in the motor.

18. The method of claim 13 wherein the second value of the current present in each phase of the stator is determined by measuring the current present with a second set of current sensors present in one of the motor and a connector for a power cable connected between the motor drive and the motor.

19. The method of claim 13 wherein the second value of the current present in each phase of the stator is determined by the following steps:

measuring a value of the current present on a DC bus in the motor drive, reading a look-up table which defines which phase of the motor is conducting as a function of a plurality of gating signals controlling operation of an inverter section in the motor drive; and reconstructing the value of the current present in each phase of the stator as a function of the value of current measured on the DC bus and of the plurality of gating signals in the look-up table.

* * * * *